US009391458B2

(12) United States Patent
Chida et al.

(10) Patent No.: US 9,391,458 B2
(45) Date of Patent: Jul. 12, 2016

(54) CONTROL METHOD AND CONTROL SYSTEM FOR PARALLEL OPERATION OF DIFFERENT TYPES OF POWER GENERATION APPARATUSES

(75) Inventors: Mitsuru Chida, Akashi (JP); Kazunori Sato, Himeji (JP); Motohiro Inoue, Kakogawa (JP); Koushichi Tateishi, Shinagawa-ku (JP)

(73) Assignees: KAWASAKI JUKOGYO KABUSHIKI KAISHA, Hyogo (JP); DAIICHI TECHNO CO., LTD., Tokyo (JP)

( * ) Notice: Subject to any disclaimer, the term of this patent is extended or adjusted under 35 U.S.C. 154(b) by 404 days.

(21) Appl. No.: 14/127,250

(22) PCT Filed: Jun. 19, 2012

(86) PCT No.: PCT/JP2012/065630
§ 371 (c)(1),
(2), (4) Date: Dec. 18, 2013

(87) PCT Pub. No.: WO2012/176771
PCT Pub. Date: Dec. 27, 2012

(65) Prior Publication Data
US 2014/0152112 A1      Jun. 5, 2014

(30) Foreign Application Priority Data
Jun. 22, 2011   (JP) ................. 2011-138756

(51) Int. Cl.
*H02J 1/00*     (2006.01)
*H02J 3/00*     (2006.01)
(Continued)

(52) U.S. Cl.
CPC . *H02J 3/46* (2013.01); *H02J 3/381* (2013.01); *H02J 9/04* (2013.01); *H02J 3/382* (2013.01);
(Continued)

(58) Field of Classification Search
CPC ............... H02J 3/46; H02J 3/381; H02J 3/38; Y10T 307/576; Y10T 307/636
USPC ........................................................ 307/68, 84
See application file for complete search history.

(56) References Cited

U.S. PATENT DOCUMENTS

| 5,422,518 A | 6/1995 | Sashida |
| 2010/0078940 A1 | 4/2010 | Kondo et al. |
| 2010/0156191 A1* | 6/2010 | Dozier ...................... H02J 3/38 307/81 |

FOREIGN PATENT DOCUMENTS

| CN | 101022260 A | 8/2007 |
| CN | 102064564 A | 5/2011 |

(Continued)

OTHER PUBLICATIONS

Communication dated Oct. 22, 2015 from the European Patent Office in counterpart application No. 12803237.2.
(Continued)

*Primary Examiner* — Carlos Amaya
(74) *Attorney, Agent, or Firm* — Sughrue Mion, PLLC

(57) ABSTRACT

A parallel operation control method for different type power generation apparatuses to shift the power generation apparatuses having respective different drooping characteristics, in which the drooping characteristic is defined as a characteristic of decrease of a rated frequency along with an increase of a load, from independent operation of the power generation apparatuses under suitable drooping characteristics to parallel operation thereof to drive a common drive target, includes determining a load of one of the power generation apparatuses by subtracting a load of the other of the power generation apparatuses from a predetermined required load; changing a drooping characteristic of the one of the power generation apparatuses so as to coincide with a drooping characteristic of the other of the power generation apparatuses; and controlling the one of the power generation apparatuses so as to maintain frequency at the time of changing the drooping characteristic.

12 Claims, 13 Drawing Sheets

(51) Int. Cl.
*H02J 3/46* (2006.01)
*H02P 9/04* (2006.01)
*H02J 3/38* (2006.01)

(52) U.S. Cl.
CPC *H02J 3/386* (2013.01); *H02J 3/387* (2013.01); *Y02E 10/763* (2013.01); *Y10T 307/576* (2015.04); *Y10T 307/718* (2015.04)

(56) References Cited

FOREIGN PATENT DOCUMENTS

| JP | 57121997 A | 7/1982 |
|----|------------|--------|
| JP | 61142931 A | 6/1986 |
| JP | 62-203522 A | 9/1987 |
| JP | 5-328638 A | 12/1993 |
| JP | 11103599 A | 4/1999 |
| JP | 11-215739 A | 8/1999 |
| JP | 2005-328622 A | 11/2005 |
| JP | 2005-354861 A | 12/2005 |
| JP | 2006-320082 A | 11/2006 |
| JP | 2007-267495 A | 10/2007 |
| JP | 201110442 A | 1/2011 |
| WO | 01/61840 A1 | 8/2001 |
| WO | 2005/089257 A2 | 9/2005 |
| WO | 2006/126003 A1 | 11/2006 |

OTHER PUBLICATIONS

Majumder R. et al., Operation and Control of Hybrid Microgrid with Angle Droop Controller TENCON 2010—2010 IEEE Region 10 Conference, IEEE, Piscataway, NJ, USA, Nov. 21, 2010, pp. 509-515.
Barklund E. et al., "Energy Management in Autonomous Microgrid Using Stability-Constrained Droop Control of Inverters", IEEE Transactions on Power Electronics, Institute of Electrical and Electronics Engineers, USA, vol. 23, No. 5, Sep. 2008, pp. 2346-2352.
Communication dated Nov. 26, 2014 from the Korean Intellectual Property Office in counterpart application No. 10-2013-7033272.
International Search Report for PCT/JP2012/065630 dated Sep. 18, 2012.
Huang et al., "No-Load Cutting-in Control for DFIG in Wind Power System Based on Variable Universe Fuzzy-PI", China Three Gorges University, Yichang 443002, China, Micro Motor, Apr. 30, 2011, vol. 4, pp. 69-72.
Communication dated Jun. 3, 2015 from the State Intellectual Property Office of the People's Republic of China in counterpart application No. 201280030663.7.
International Preliminary Report on Patentability dated Jan. 9, 2014 from The International Bureau of WIPO in counterpart International Patent Application No. PCT/JP2012/065630.
Communication dated Nov. 18, 2014 from the Japanese Patent Office in counterpart Japanese Patent Application No. 2013521586.

* cited by examiner

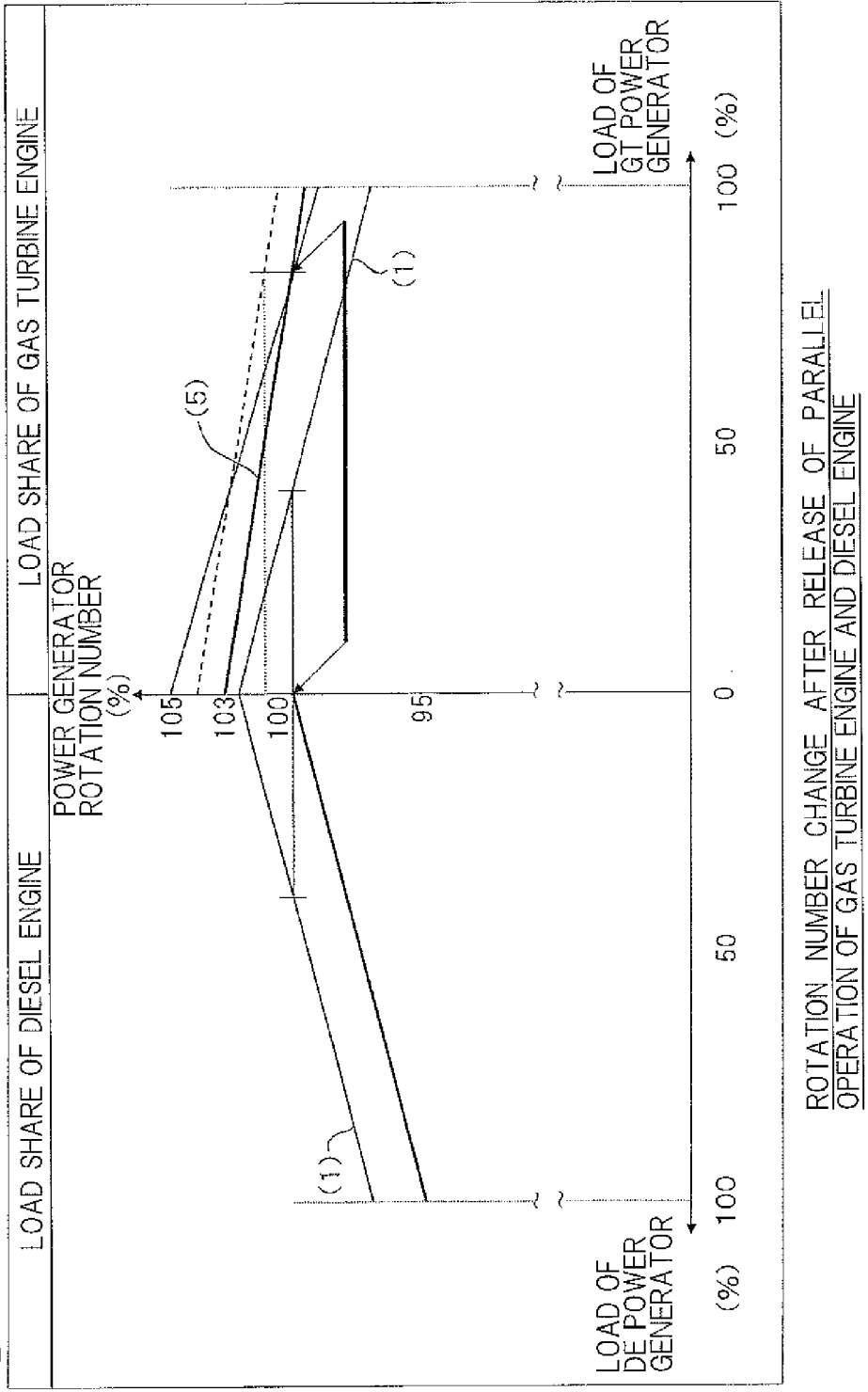

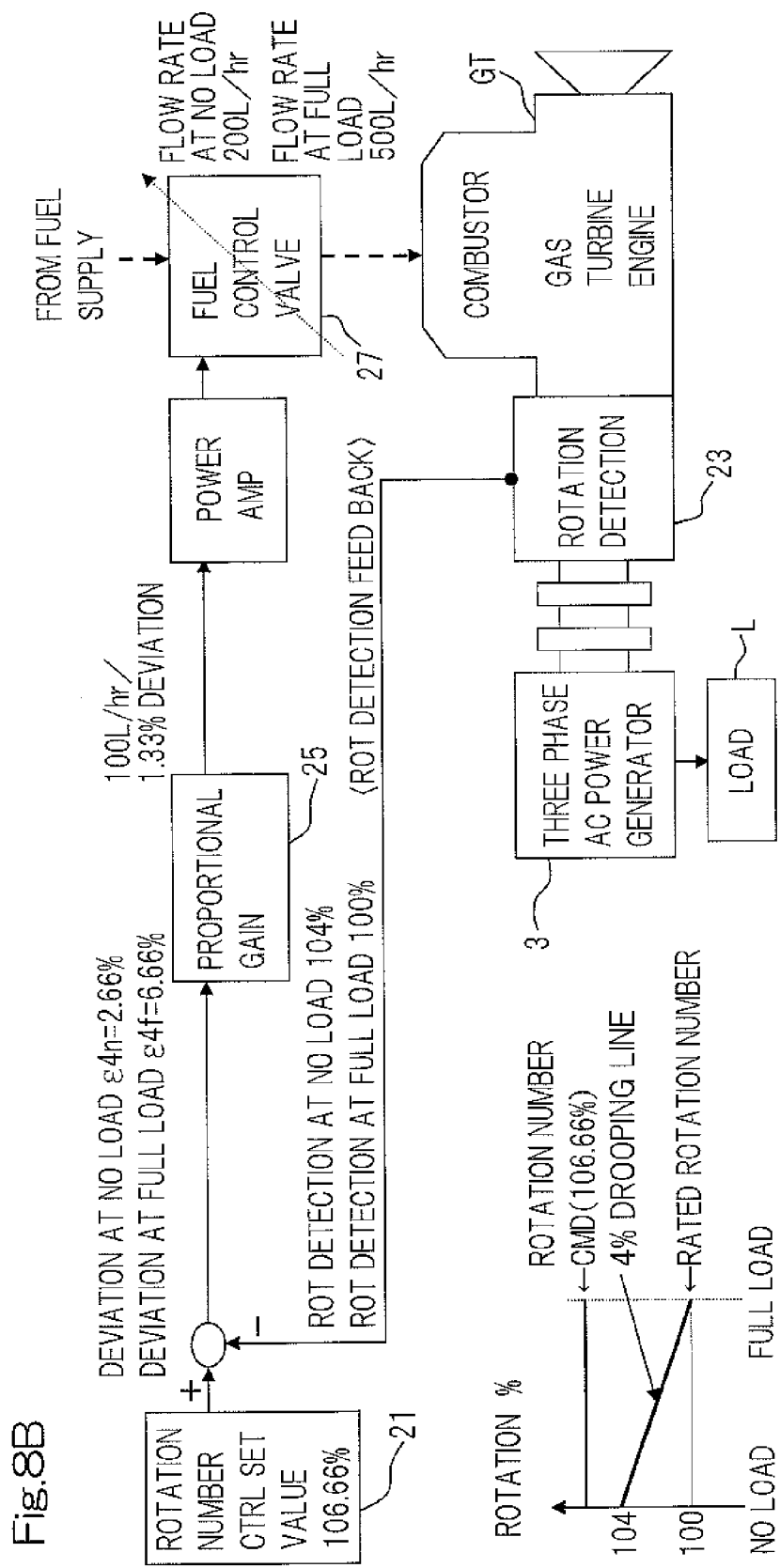

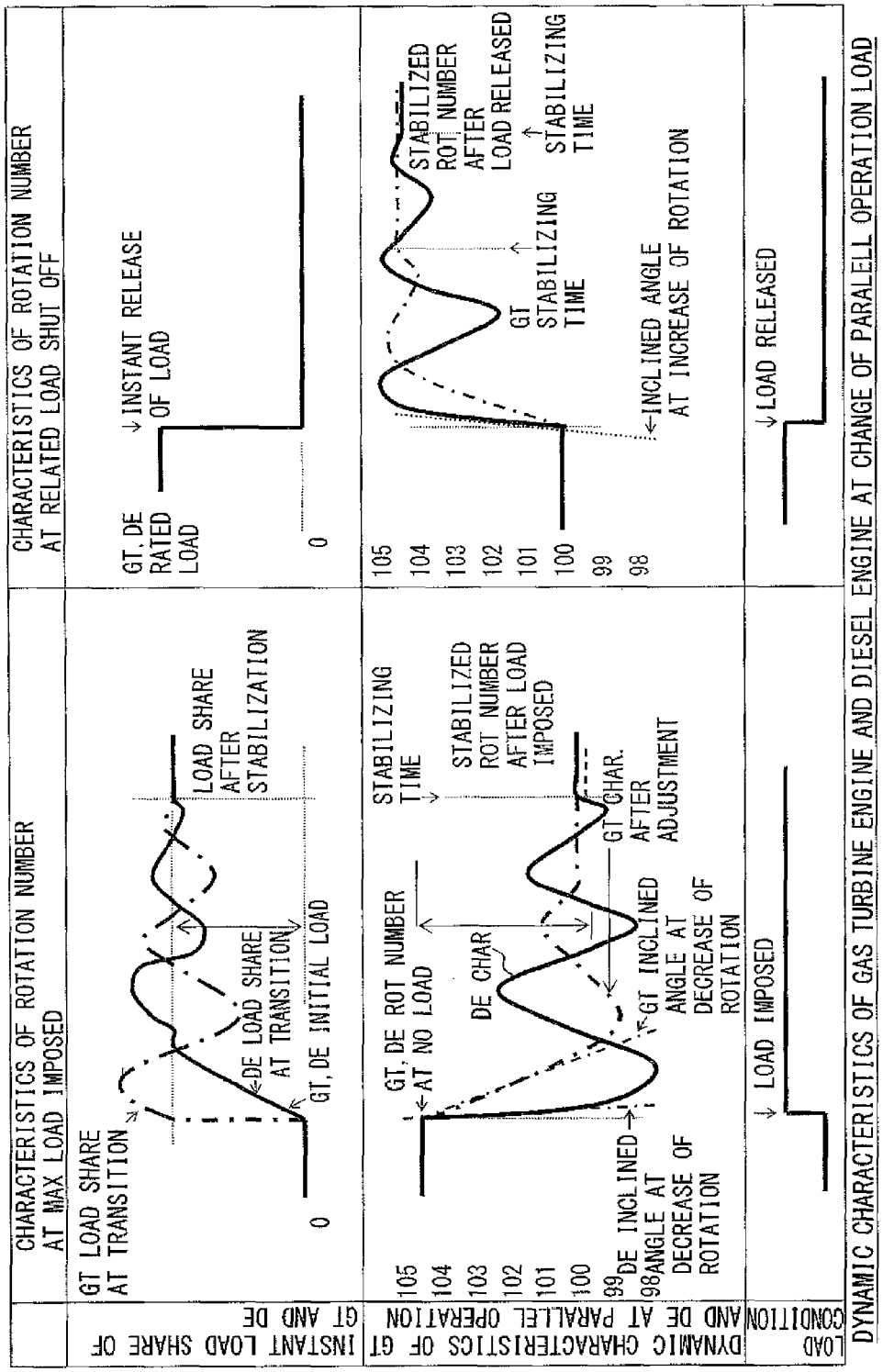

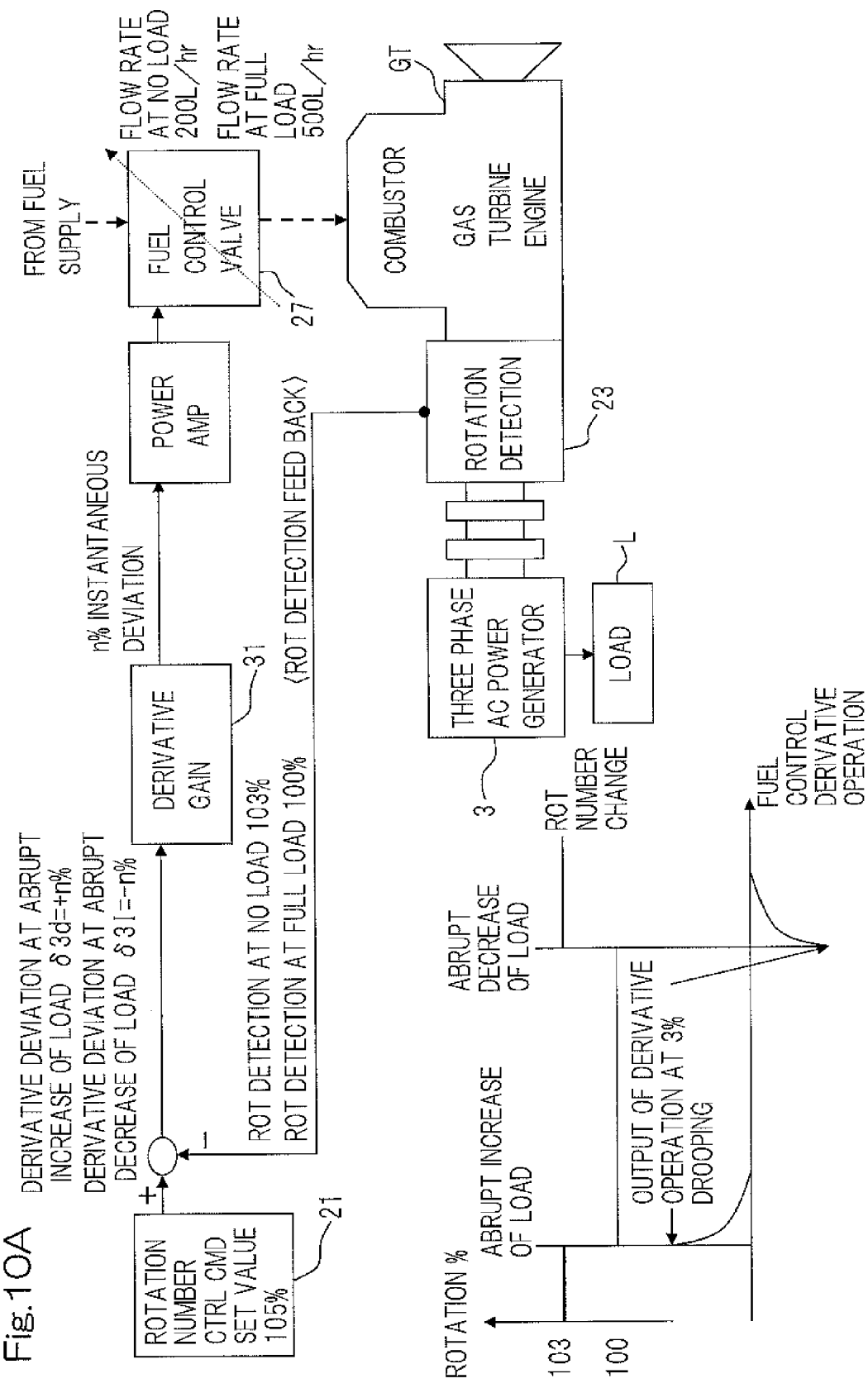

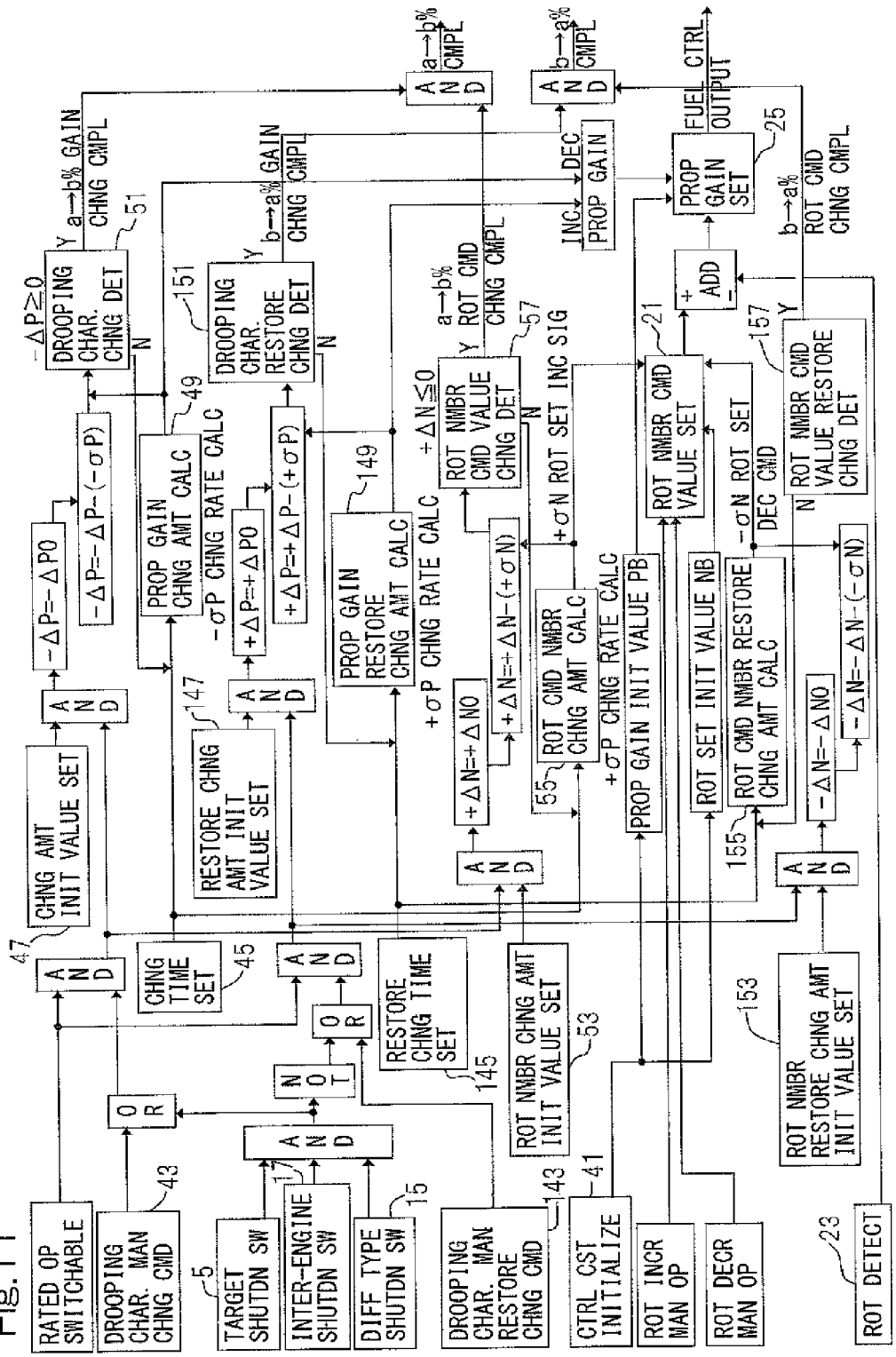

CONTROL METHOD AND CONTROL SYSTEM FOR PARALLEL OPERATION OF DIFFERENT TYPES OF POWER GENERATION APPARATUSES

CROSS REFERENCE TO THE RELATED APPLICATION

This application is based on and claims Convention priority to Japanese patent application No. 2011-138756, filed Jun. 22, 2011, the entire disclosure of which is herein incorporated by reference as a part of this application.

BACKGROUND OF THE INVENTION

1. Field of the Invention

The present invention relates to a control method and a control system for stably performing a parallel operation of different types of power generation apparatuses having respective different drooping characteristics.

2. Description of Related Art

In some of the marine vessels of an electric propulsion system, two power generation apparatuses driven by respective prime movers are generally employed so that during a normal (low speed) marine navigation, only one of the prime movers is activated for economical navigation, and during an abrupt acceleration or a high speed marine navigation, both of the prime movers are operated in parallel with each other. In this respect, see, for example, the patent document 1 listed below. In this way, the two performances, that is, the marine cruising radius and the acceleration/speed characteristic, may be simultaneously pursued. For further efficient marine navigation, it may be contemplated to use two different types of prime movers, for example, a diesel engine and a gas turbine engine.

In various electric power source facilities, a power generation apparatus, which is regularly put into operation, and a power generation apparatus, which is put into operation in the event of an emergency or an acute situation are differentiated from each other depending on the type of the engine prime mover, and the parallel operation of the power generation apparatuses having different types and/or characteristics are not generally practiced. In addition, in the event of occurrence of any trouble in a portion of the regularly operated device or where a peak-cut operation with the use of a standby apparatus is desired because of a considerable change in load, it is a general practice to operate power generation apparatuses, including the standby apparatuses, that have been so adjusted in advance to be the same type and to have the same drooping characteristics.

In the case of an arbitrary shutdown of various power generation apparatuses forming an electric power source system, or in the case of electric power source facilities of a natural energy recovering type that undergoes significant changes depending on times of a day and/or ambient environments, changes appear in the rotation number (frequency) drooping characteristic on the side of the electric power source system and also in the impedance of the system power source side at all times. For such electric power source facilities, a control method and a control system, which are capable of optimally switching by changing arbitrarily the drooping characteristic of the power generation apparatuses, that are to be parallel operated with the system side, in dependence on a change of the system power source (electric power generation facilities in operation forming the system) of the power generation apparatus forming a part of such electric power source facilities to suit characteristics between the power generation apparatuses forming the electric power source facilities, are considered as required.

PRIOR ART DOCUMENT

[Patent Document 1] JP Laid-open Patent Publication No. 2005-354861

SUMMARY OF THE INVENTION

As discussed hereinabove, where the parallel operation of a plurality of power generation apparatuses is to be performed, in order to equally distribute the load between the power generation apparatuses from a light load to a full load in dependence in the power generator capacity, the need is realized that the rotation (frequency) drooping characteristics (characteristic of the rotation number (frequency) being lowered in dependence on an increase of the load) of the power generation apparatuses need to coincide with each other and, therefore, in the case of the power generation apparatuses having different types of prime movers mounted thereon, it has hitherto been a general practice that the drooping characteristic of one of the prime movers that has an excellent drooping characteristic, that is, less susceptible to a reduction in rotation number with an increase of the load, is operated under a condition in which the drooping characteristic of the other of the prime movers has been adjusted to accommodate that of the other of the prime movers having inferior drooping characteristic regardless of independent operation or parallel operation, whereby the power generation apparatuses are put into parallel operation or paralleled-off without the drooping characteristics changed. For this reason, the prime movers are unable to bring out their inherent performances during independent operations of those prime movers and, in the case of the marine vessel, the efficient navigation thereof has been hampered. Also, even in the case of the general electric power source facilities, limitations have been imposed on the parallel operation. It is to be noted that in the description that follows, reference is made to the rotation number (frequency) as an indication of the rotational speed.

In addition, in the electric power source facilities comprised of a variety of power generation apparatuses as discussed above, the electric power source configuration that varies depending on the change in load and the manner of how the power generation apparatuses are operated is applied a limitation to operate according to that is adequate. In other words, a combination limited to the similar power generation apparatuses and the operation unified to one of the power generation apparatuses, which has a mediocre drooping characteristic while the other of the power generation apparatuses having the excellent drooping characteristic is sacrificed, have been set up as a fundamental operation.

In view of the foregoing, the present invention has for its object to provide a control method and a control system, in which different types of power generation apparatuses having different drooping characteristics can be parallel operated stably and highly efficiently without sacrificing the performances of those power generation apparatuses that are exhibited when they are independently operated. Also, it is another object of the present invention to provide the control method and the control system of the kind referred to above, which arbitrarily accommodate a change in rotation (frequency) drooping characteristic resulting from initiation of the parallel operation of the power generation apparatuses in dependence on the characteristic of a varying system side power generation apparatus and a change in combination of the power generation apparatuses that are formed during the parallel operation.

In order to accomplish these objects of the present invention, the parallel operation control method or the parallel operation control system, that is designed in accordance with the present invention, is a parallel operation control method or system for different types of power generation apparatuses to shift the plurality of power generation apparatuses that have respective different drooping characteristics, in which the drooping characteristic is defined as a characteristic of decrease of a rated frequency along with an increase of a load, from an independent operation of each of the power generation apparatuses under respective suitable drooping characteristics to the parallel operation of the apparatuses to drive a common drive target, including: determining a load of one of the power generation apparatuses by subtracting a load of the other of the power generation apparatuses from a predetermined required load; changing a drooping characteristic of the one of the power generation apparatuses so as to coincide with a drooping characteristic of the other of the power generation apparatuses; and controlling the one of the power generation apparatuses so as to maintain frequency thereof at the time of changing the drooping characteristic.

According to the above described construction, even from the condition in which each of the power generation apparatuses are independently operated under its optimum drooping characteristic, transit to the parallel operation can be enabled while an undesirable occurrence of an unbalance of the load is suppressed. Accordingly, without adversely affecting the performance of each of those power generation apparatuses and in a stabilized fashion, the parallel operation of the different types of power generation apparatuses may be accomplished.

In one embodiment of the present invention, performing a feedback control to maintain the frequency of each of the power generation apparatus to be constant may be further included, in which a derivative control based on a time derivative of the frequency may be performed and, also, the derivative control with respect to the one of the power generation apparatuses that has a higher frequency inertia force may be suppressed or stopped at the time of an abrupt change of a load. According to this construction, even relative to a considerably large load change at the time of transit to the parallel operation and, also, at the time of release of the parallel operation, the unbalance of the load between or among the power generation apparatuses can be further effectively suppressed. For example, the other of the power generation apparatus is a diesel engine while the one of the power generation apparatus is a gas turbine engine having a considerable inertia force.

Although in this instance reference has been made to respective examples of the diesel engine and the gas turbine engine, which are markedly different in machinery characteristic as a power generation apparatus from each other, application may be made to a windmill, a watermill, which are capable of being controlled in its rotation number, or a static type fuel cell power generation apparatus, a solar energy generation apparatuses or the like. In addition, application may be made to any kind of power generation apparatuses capable of undergoing a self-sustaining.

In one embodiment of the present invention, at the time of shifting to the independent operation after the parallel operation has been released, the drooping characteristic of the one of the power generation apparatus may be restored to the drooping characteristic before the changing. By so doing, under a condition in which the drooping characteristic is changed only where the parallel operation is required it is operated, and, where the independent operation is performed consequent upon the unnecessity of the parallel operation, the power generation apparatus that is to be independently operated is operated under the optimum condition.

Any combination of at least two constructions, disclosed in the appended claims and/or the specification and/or the accompanying drawings should be construed as included within the scope of the present invention. In particular, any combination of two or more of the appended claims should be equally construed as included within the scope of the present invention.

BRIEF DESCRIPTION OF THE DRAWINGS

In any event, the present invention will become more clearly understood from the following description of embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

FIG. 7 is a chart used to explain the principle of changing drooping characteristic in an embodiment of the present invention;

FIG. 8B is a block diagram showing the control method for a proportional gain in an embodiment of the present invention;

FIG. 9 is a chart schematically showing difference in dynamic characteristics between the different types of power generation apparatuses;

FIG. 10A is a block diagram showing a derivative gain control method according to an embodiment of the present invention;

FIG. 11 is a block diagram showing the control system according to an embodiment of the present invention.

DESCRIPTION OF EMBODIMENTS

Hereinafter, embodiments of the present invention will be described in detail with reference to the accompanying drawings.

Figure 1:
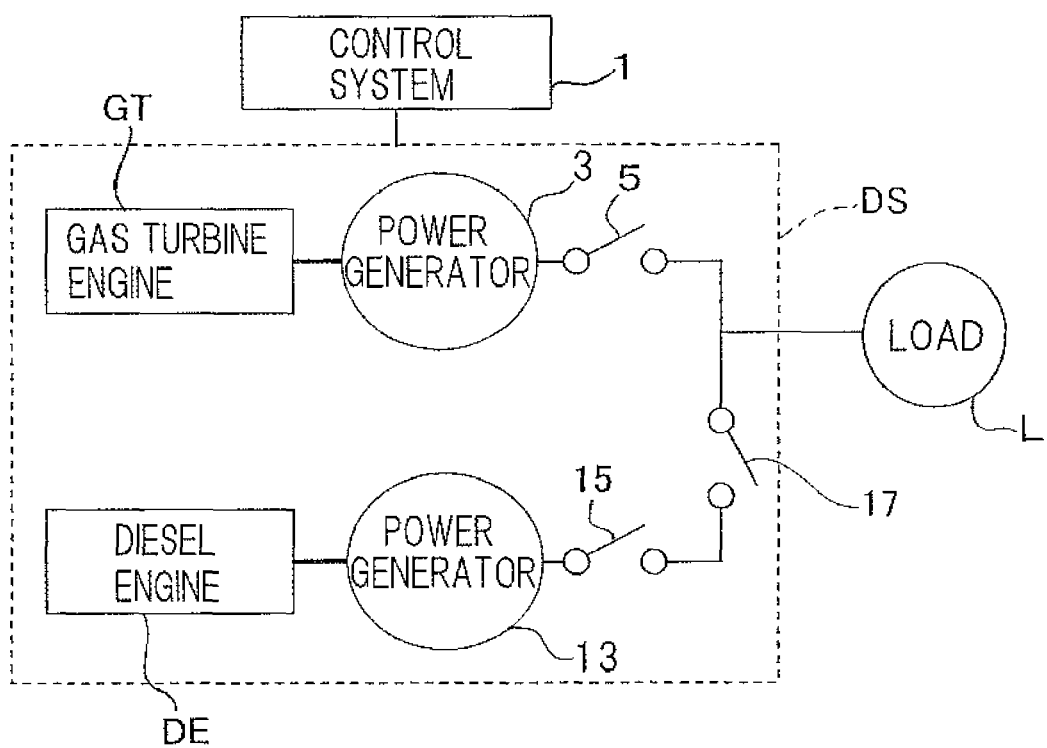
FIG. 1 is a block diagram showing a schematic construction of a driving system for an equipment having a control system, which executes a method according to an embodiment of the present invention, mounted thereon.

FIG. 1 illustrates a schematic structure of a plurality of different types of power generation apparatuses and a drive system DS of an equipment such as, for example, a marine vessel on which a control system is mounted for executing a method of controlling the parallel operation of the different types of power generation apparatuses according to a first embodiment of the present invention. This control method is a method for different types of power generation apparatuses when shifting the plurality of power generation apparatuses that have respective different drooping characteristics, in which the drooping characteristic is defined as a characteristic of decrease of a rated rotation number (frequency) along with an increase of a load, from an independent operation of each of the power generation apparatuses under respective suitable drooping characteristics to the parallel operation of the apparatuses to drive a common drive target. In the embodiment now referred to, as the different types of power generation apparatuses to be controlled by the control system 1, a gas turbine engine GT and a diesel engine DE are utilized.

The power generation apparatus may not be necessarily limited to a gas turbine or a diesel engine, but other apparatuses of a kind having a rotary machine of which rotation number (frequency) can be manipulated, such as a windmill or a water turbine, may be employed therefor. Also, the present invention may be similarly applicable to a power generation apparatus of a stationary type having no rotary machine, for example, a fuel cell power generation apparatus, a sunlight power generation apparatus (solar cell) or the like. In addition, application may be made to a power generation apparatus of any kind capable of self-sustaining operation.

In describing the embodiment now referred to, although reference will be made to the use of the gas turbine engine GT as an example of engine having a smaller drooping characteristic (excellent in the rotation number (frequency) characteristic) and the diesel engine DE as an example of engine having a larger drooping characteristic (inferior in the rotation number (frequency) characteristic), the present invention may be equally applicable not only to the use of, for example, a gas engine and an Otto cycle engine but also the use of a windmill and a wind turbine, of which rotation number (frequency) can be manipulated, as well as a stationary type such as a fuel cell power generation apparatus and a solar power generation apparatus or the like.

As a structural example of the different types of power generation apparatuses, a power generator 3 for the gas turbine engine GT is connected with a load L of a target object to be driven through a gas turbine engine shut-off switch 5. On the other hand, a power generator 13 for the diesel engine DE is connected with the load L through a diesel engine shut-off switch 15 and an inter-engine (power generation apparatus) connection shut-off switch 17.

In the practice of the control method according to the embodiment, control is made in such a way that when the gas turbine engine GT and the diesel engine DE are shifted into a parallel operation, a load of one of the power generation apparatuses (for example, the gas turbine engine GT in this case) is determined by subtracting a load for the other of the power generation apparatuses (for example, the diesel engine DE in this case) from a predetermined required load, the drooping characteristic of the gas turbine engine GT is changed so as to coincide with the drooping characteristic of the diesel engine DE, and, during this change of the drooping characteristic, a rotation number (frequency) of the gas turbine engine GT is maintained.

Figure 2:
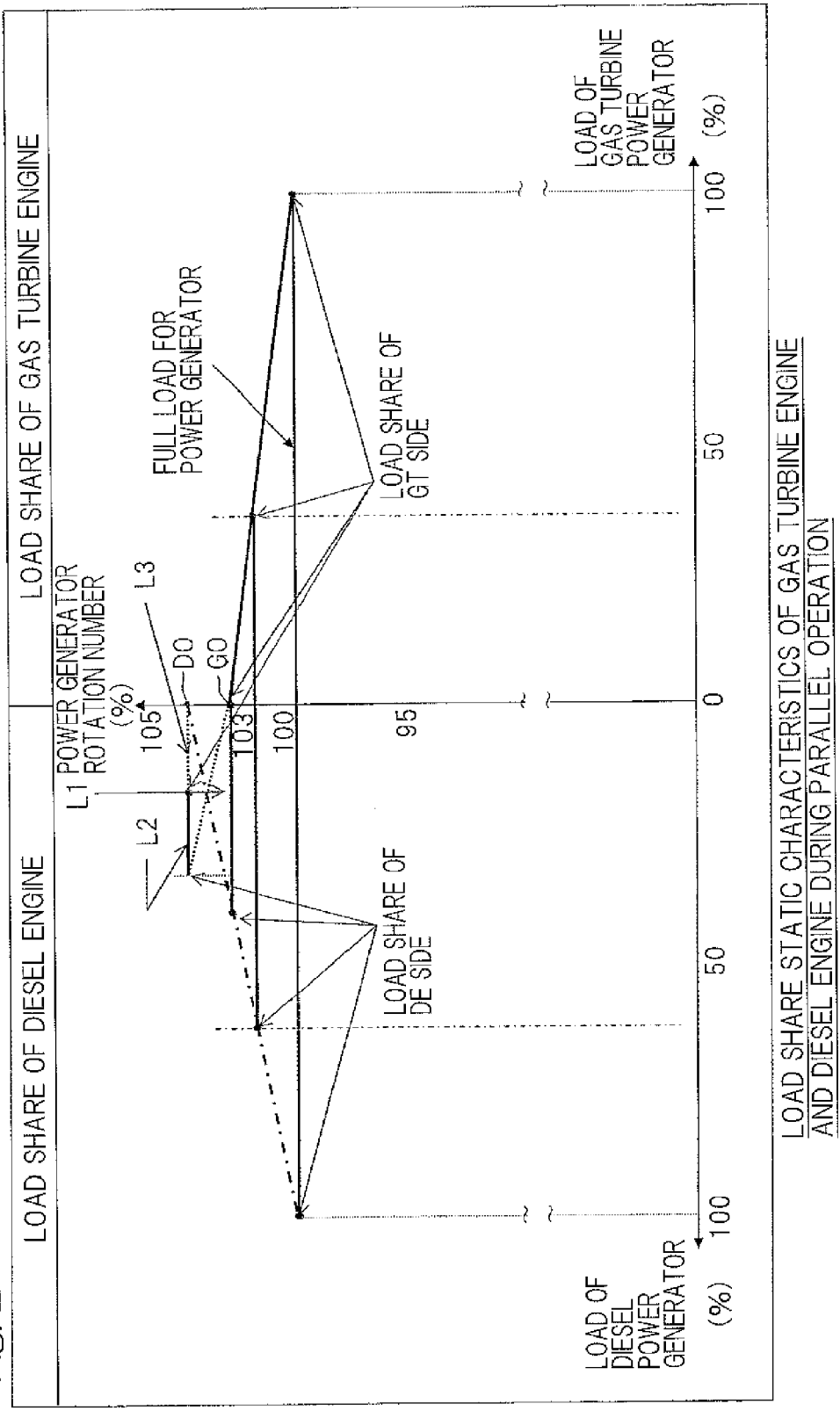
FIG. 2 is a chart showing a condition in which the drooping characteristics are inconsistent between different types of power generation apparatuses.

FIG. 2 illustrates an aspect of a load sharing of the power generation apparatuses (for example, the engines GT and DE in this instance) relative to the power generator load. The drooping base point G0 of the gas turbine engine GT, that is, the rotation number (frequency) under no-load conditions, and the drooping base point D0 of the diesel engine DE are different from each other and are, for example, 103% and 104%, respectively, relative to the rotation number (frequency) under full-load conditions. Accordingly, the respective drooping characteristics, each representing the rotation (frequency) decreasing rate under full-load conditions relative to the no-load conditions, become 3% and 4%, respectively, and are thus different from each other. Accordingly, if each of the engines GT and DE is set to be 100%-loaded (rated) when the power generator 13 is so set as to be fully loaded, under a light-loaded condition, only the diesel engine DE having higher rotation number (frequency) bears the load as shown by the solid line L1 and, on the other hand, the gas turbine engine GT undergoes motoring (non-loaded rotation), thus resulting in unbalance between the respective loads that are shared by those engines. Since the gas turbine engine GT is driven by the diesel engine DE to rotate at the same rotation number (frequency), relative to the solid line L2 representing the load that ought to be borne by the diesel engine DE, the load actually borne by the diesel engine DE corresponds to an amount obtained by adding a component represented by the solid line L2 to a component represented by the phantom line L3 representing the load for driving the gas turbine engine GT.

In order to enable the parallel operation between the different types of the power generation apparatuses GT and DE stably with a good balance in load, it is necessary that the respective drooping characteristics (static characteristics) of the different types of the power generation apparatuses GT and DE match with each other and the drooping base points thereof also coincide with each other. If the drooping characteristics match with each other, the amounts of loads to be adjusted between the different types of power generation apparatuses GT and DE are small and load sharing rates become uniform, but if the drooping characteristics thereof do not coincide with each other, a considerable unbalance occurs in the load sharing rate between the different types of power generation apparatuses GT and DE under low-load conditions as discussed above. Also, in the event of the instantaneous decrease of the load, the motoring will occur in one of the engines having smaller drooping characteristic (the gas turbine engine GT in this instance shown in FIG. 2), and the diesel engine having larger drooping characteristic comes to bear this component.

Figure 3:
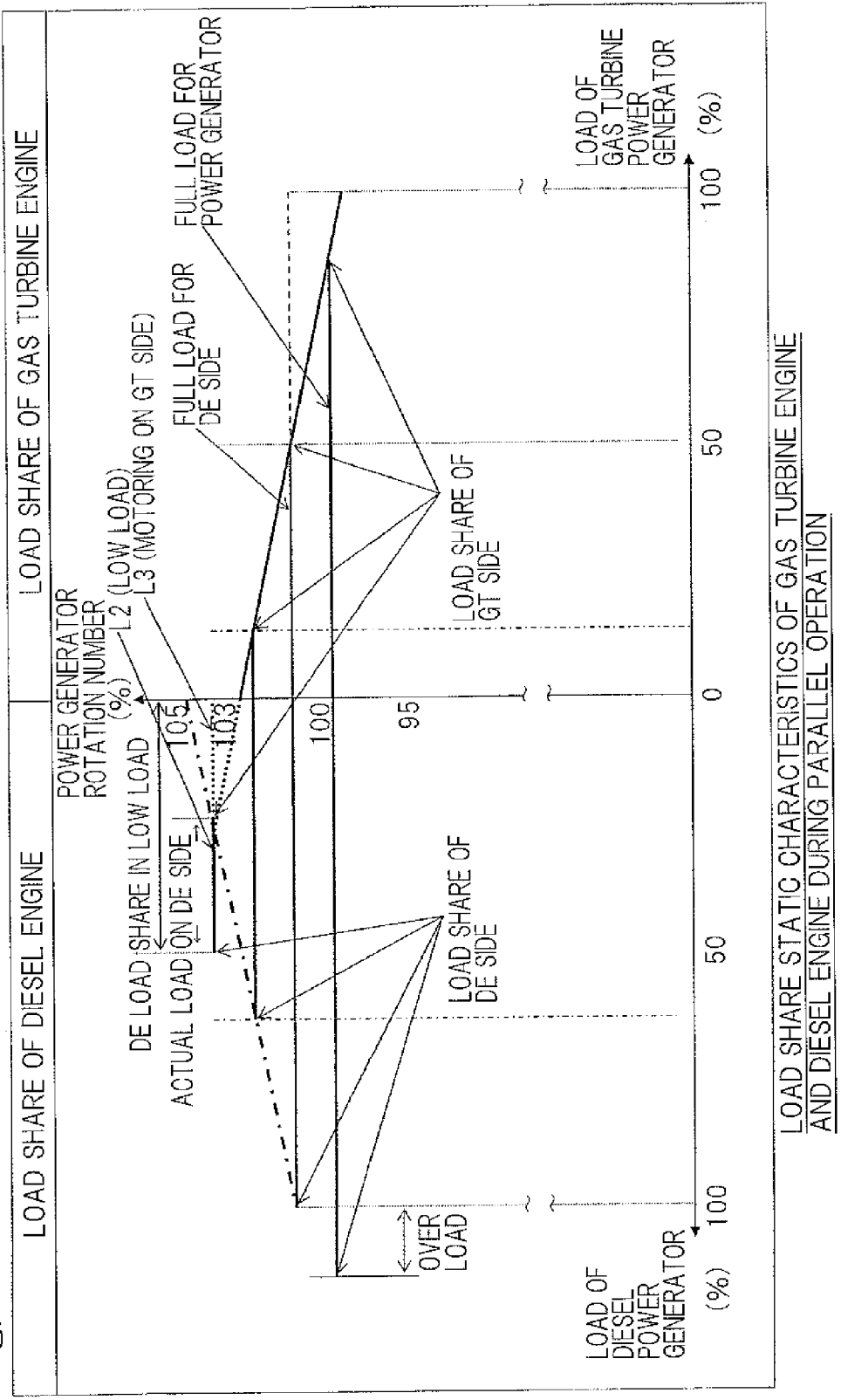
FIG. 3 is a chart showing a condition in which respective base points of the drooping characteristics of the different types of power generation apparatuses are inconsistent from each other.
Figure 4:
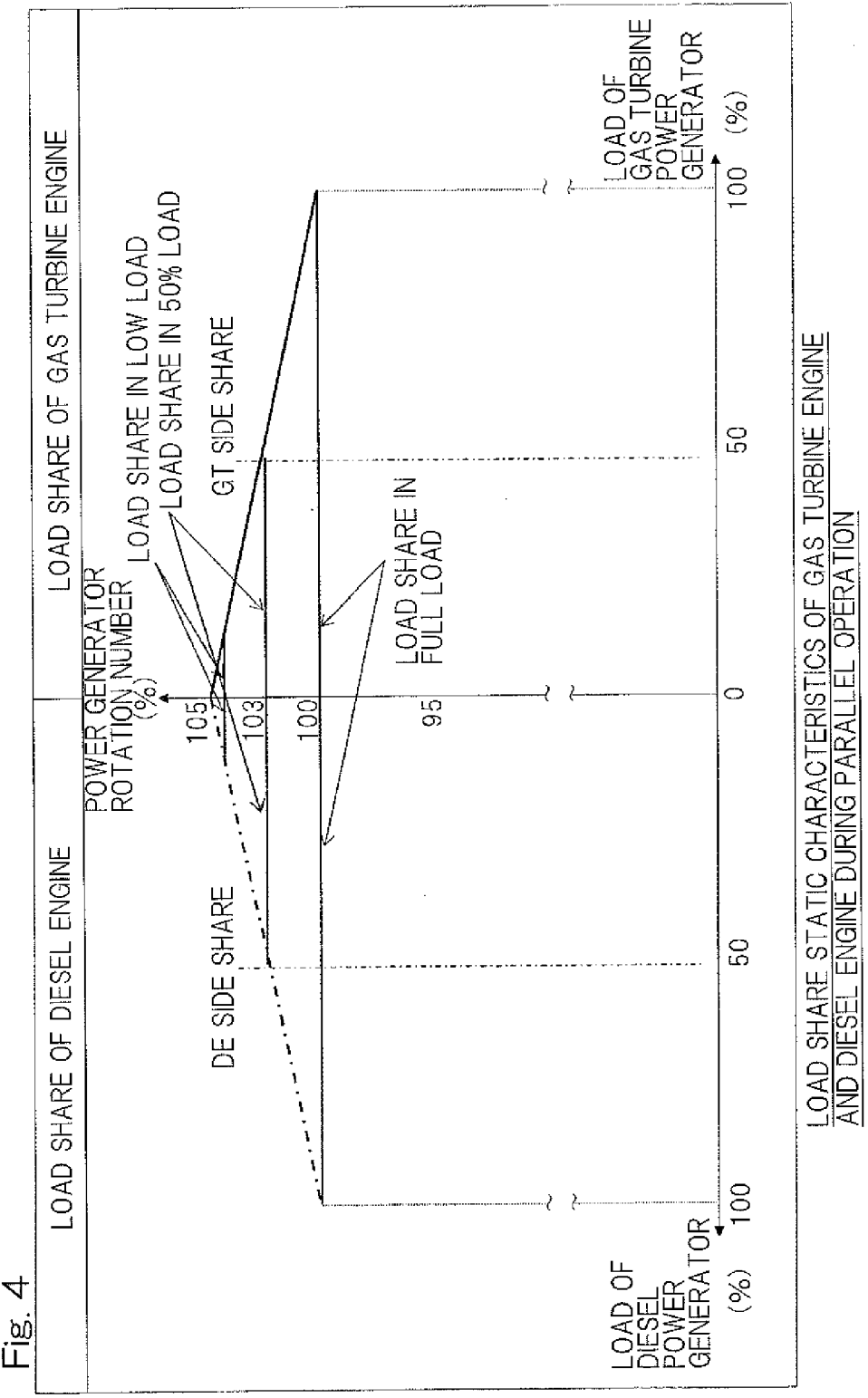
FIG. 4 is a chart showing a condition in which the drooping characteristics of the different types of power generation apparatuses and their base points are consistent with each other.

In addition, as shown in FIG. 3, even though the drooping characteristics under the no-load conditions and the full-load conditions coincide with each other, the unbalance occurs in load between the different types of power generation apparatuses unless the drooping base point G0, and D0 coincide with each other. However, as shown in FIG. 4, if the drooping characteristics and their base points match with each other, the load sharing is uniformly accomplished and the static load sharing balance will not be ruined.

Figure 5:
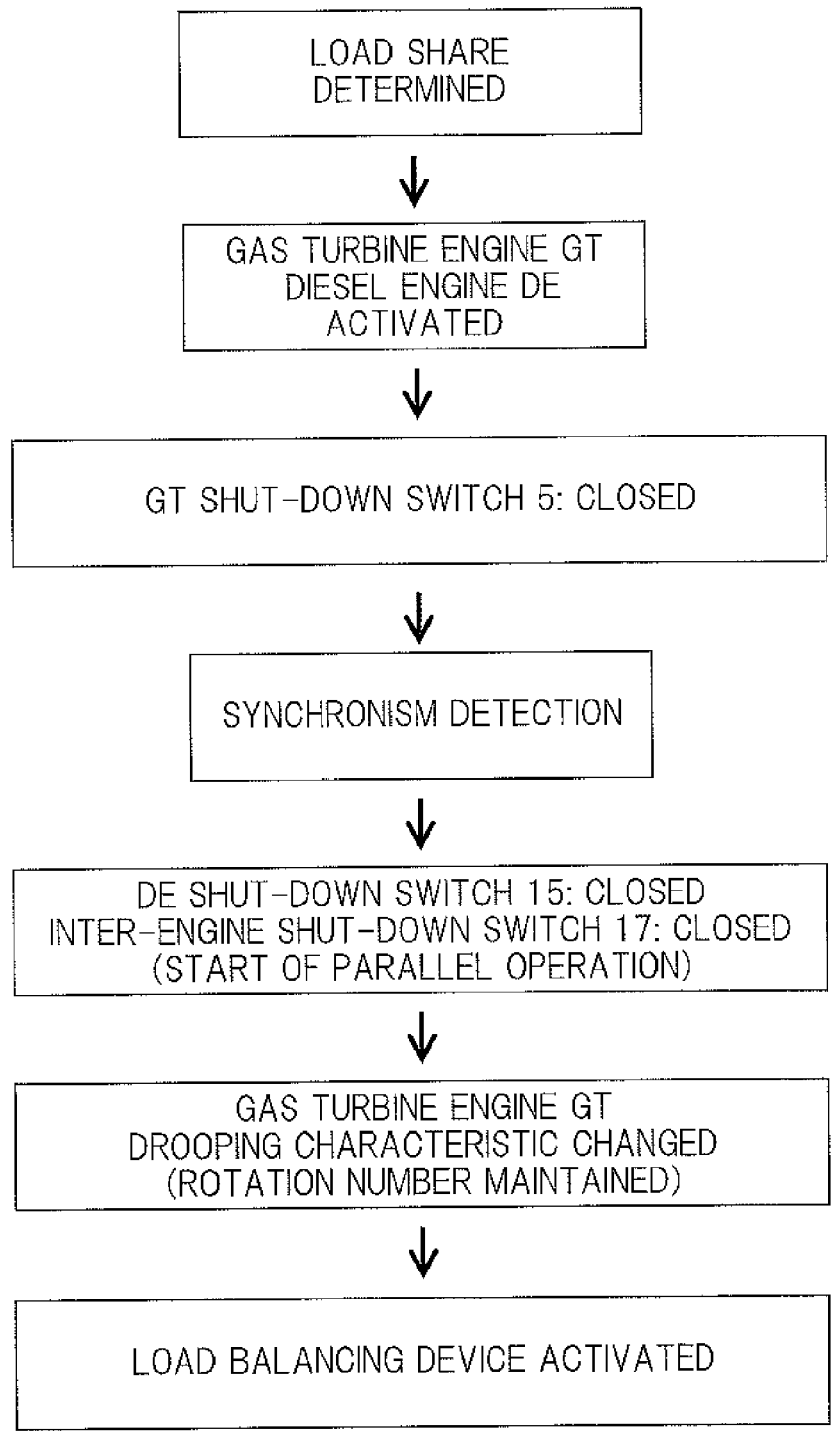
FIG. 5 is a flow chart showing a sequence of the parallel operation procedures according to an embodiment of the present invention.

Procedures for shifting into the parallel operation where the change in drooping characteristic is performed automatically are shown in FIG. 5. At the outset, in a condition in which the load sharing during the parallel operation is determined, the gas turbine engine GT and the diesel engine DE, which are different types of power generation apparatuses, respectively, are activated in response to a activation command to initiate the independent operation of each of those engines. Subsequently, the shut-off switch 5 on the side of the gas turbine engine GT is closed and the power generator 3 on the side of the gas turbine engine GT is connected with the load L.

Thereafter, synchronism detection is performed for the parallel operation. In order to enable the parallel operation of the engines GT and DE of the different types of the power generation apparatuses to be performed, it is necessary that in a manner similar to the ordinary parallel operation, three synchronization conditions including (a) the power generator voltage, (b) the frequency and (c) power generator voltage phase need to be satisfied. After it has been confirmed that all of those conditions for the synchronization detection have been satisfied, the shut-off switch 15 on the side of the diesel engine DE, which is a power generation apparatus, and the inter-engine connection shut-off switch 17 are closed.

In the event that the inter-engine connection shut-off switch 17 is closed and a parallel operation start command for shifting to the parallel operation of the gas turbine engine GT and the diesel engine DE, which are the power generation apparatuses that have been independently operated, is outputted, the drooping characteristic of the gas turbine engine GT, which is one of the different types of power generation apparatuses, is changed so as to allow it to be matched with the drooping characteristic of the diesel engine DE, which is the other of the different types of power generation apparatuses, in accordance with the procedures which will be described in detail subsequently. Thereafter, a load balancing device is activated to shift to a load balanced condition.

During the changing of the drooping characteristic as a specific example, the drooping characteristic and the rotation number (frequency) command value are simultaneously changed from the suitable operation condition during the independent operation of the gas turbine engine GT. This principle of changing the drooping characteristic will be explained with particular reference to the chart shown in FIG. 6. Referring to the chart (a) illustrating a case in which the gas turbine engine GT bears a full load, a condition indicated by the straight line (1) (the drooping characteristic: 3%, the rotation number (frequency) under the no-load conditions: 103%) is a condition assumed during the independent operation of the gas turbine engine GT. A condition, in which only the drooping characteristic is assumed to be changed from the straight line (1) to 4% without the base point G0 of the drooping characteristic being altered, is indicated by the straight line (2). A condition, in which only the rotation number (frequency) command value is assumed to be changed from the condition expressed by the straight line (1), is indicated by the straight line (3). By concurrently executing a manipulation to change from the straight line (1) to the straight line (2) and a manipulation to change from the straight line (1) to the straight line (3), a changeover takes place from the straight line (1), which represents the independent operation of the gas turbine engine GT, to the straight line (4) in which only the drooping characteristic is changed and no rotation number (frequency) of the gas turbine engine GT is changed.

Figure 6:
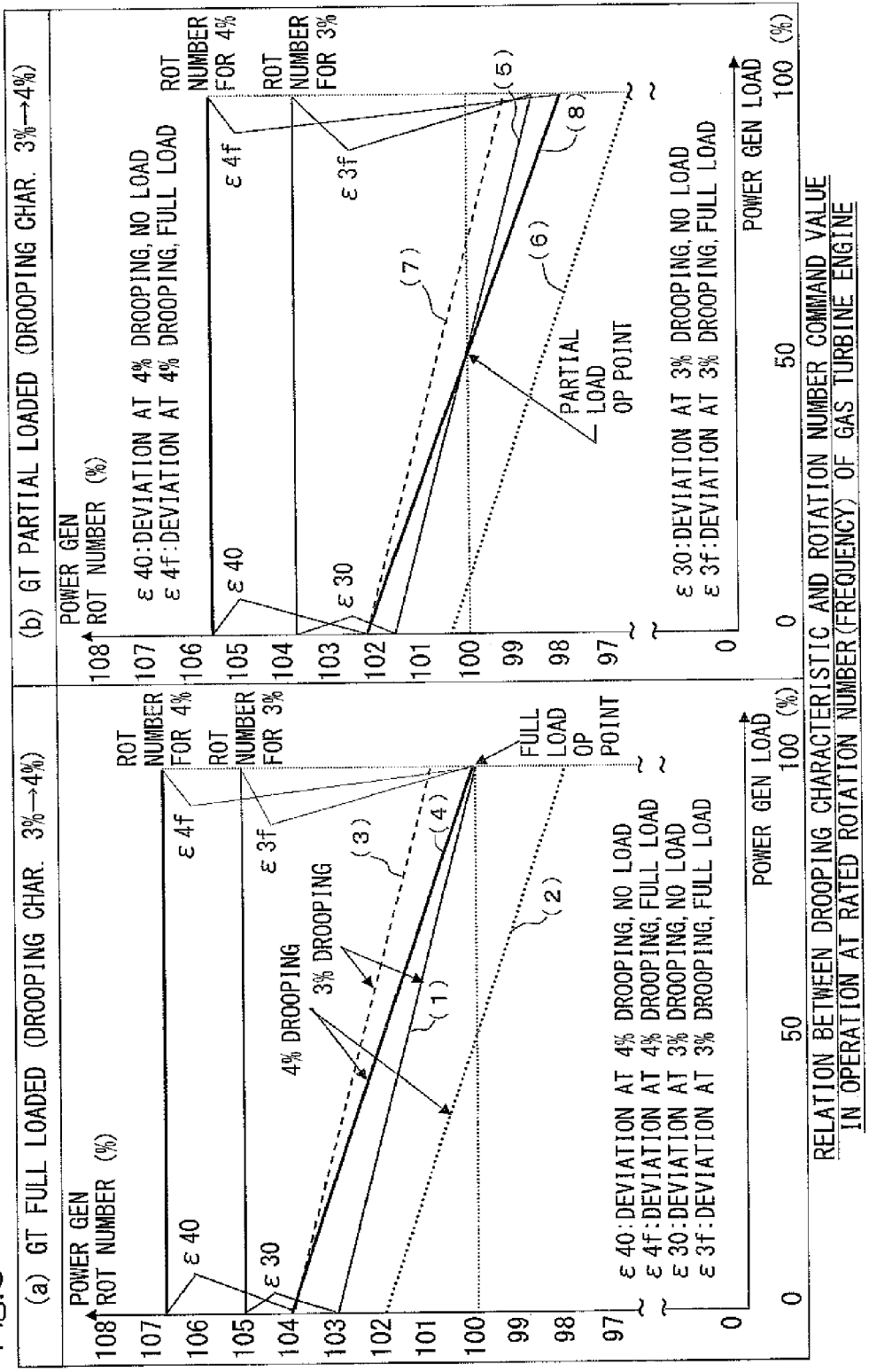
FIG. 6 is a chart used to explain the principle of changing drooping characteristic in an embodiment of the present invention.

Similarly, when the gas turbine engine GT bears a partial load (for example, 50%), as shown by the chart (b) in FIG. 6, by concurrently executing a manipulation (represented by the straight line (6)) to change the drooping characteristic from the condition indicated by the straight line (5) (the drooping characteristic: 3%, the rotation number (frequency) under the no-load conditions: 101.5%), in which the independent operation takes place, to 4% without changing the base point G0 of the drooping characteristic and a manipulation to change the rotation number (frequency) command value (represented by the straight line (7)), a shift may be made to the condition indicated by straight line (8), in which only the drooping characteristic is changed without the rotation number (frequency) of the gas turbine engine GT being changed. As described above, the value of the drooping characteristic represents the decreasing rate of the rotation number (frequency) under the 100% loaded conditions relative to the no-load conditions and the rotation number (frequency) under the no-load conditions represents a ratio of the rotation number (frequency) under the no-load conditions relative to the rotation number (frequency) under the 100% full loaded conditions.

On the other hand, when the parallel operation is cancelled to allow the independent operation of the gas turbine engine GT to be resumed, by means of procedures reverse to the procedures of changing the drooping characteristic at the time of initiation of the parallel operation, only the drooping characteristic is restored to the value at the time of the independent operation without changing the rotation number (frequency) of the gas turbine engine GT. In other words, as shown in FIG. 7, from the condition represented by the straight line (1), in which the gas turbine engine GT and the diesel engine DE are parallel operated at 50% load sharing with 4% drooping characteristics, by transferring the load on the diesel engine DE to the side of the gas turbine engine GT and, at the same time, returning the drooping characteristic on the side of the gas turbine engine GT from 4% to 3% while the rotation number (frequency) command value is returned to the original value, the condition of the straight line (5) in which the gas turbine engine GT is independently run with 3% drooping characteristic without changing the rotation number (frequency) of the gas turbine engine GT is changed.

Where from a condition in which the system power source is comprised of three or more power generation apparatuses, only one or some of the power generation apparatuses having different characteristics are released, the remaining power generation apparatus(es) may be switched to the original drooping characteristic(s). For example, where while three engines including two gas turbine engines GT and one diesel engine DE are parallel operated with 4% rotation (frequency) drooping characteristics, only the diesel engine DE is released, the switching from the 4% drooping characteristic to the 3% drooping characteristic that is suited to the gas turbine engine GT, simultaneously with the releasing, can be simultaneously accomplished without impairing the load balance of the two gas turbine engines GT.

Figure 8A:
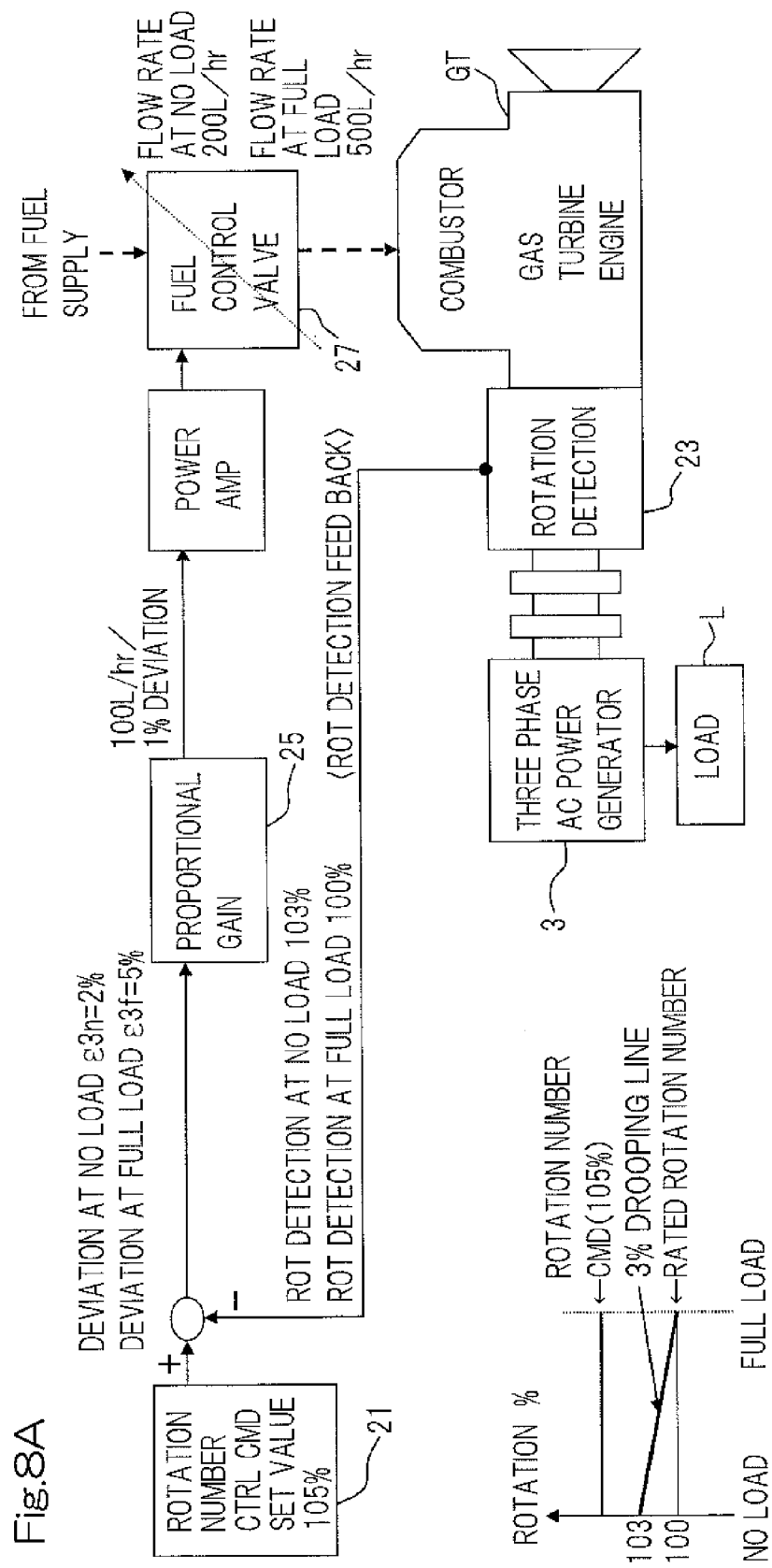
FIG. 8A is a block diagram showing a control method for a proportional gain in an embodiment of the present invention.

An example of a specific control method for changing the drooping characteristic is shown in FIGS. 8A and 8B. In this example, the rotation number (frequency) command value, set by a rotation number (frequency) command value setting unit 21, and the rotation (frequency) detection value measured by a rotation number (frequency) detector 23 of the gas turbine engine GT are compared with each other and, based on the deviation between them, a proportional gain setting unit 25 determines a proportional gain and, by adjusting a fuel supply control valve 27 on the basis of this proportional gain so determined, a feedback proportional control to control the flow rate of fuel is performed.

FIG. 8A illustrates one example of the fuel flow rate proportional control method applied to the gas turbine engine GT having the 3% drooping characteristic. The amount of fuel supplied to a combustor of the gas turbine engine GT in this example is 200 L/hr under the no-load conditions and 500 L/hr under full-load conditions, and the rotation number command value is set to 105% relative to the rated rotation number (frequency) under full-load conditions. Accordingly, the deviation ∈3n relative to the rotation (frequency) detection value under the no-load conditions is 2% and the deviation ∈3f relative to the rotation (frequency) detection value under full-load conditions is 5% and, therefore, by setting the proportional gain at 100 L/hr (/1%), the fuel supply control valve 27 is controlled to set the flow rate under the no-load conditions to 200 L/hr and the flow rate under full-load conditions to 500 L/hr.

An example of control in which the condition of FIG. 8A, in which the drooping characteristic is 3%, is changed to the condition in which the drooping characteristic is 4% is shown in FIG. 8B. In this instance, the rotation number (frequency) command value is set to 106.66% and the deviation ∈3n relative to the rotation (frequency) detection value under the no-load conditions becomes 2.66% and the deviation ∈3f relative to the rotation (frequency) detection value under full-load conditions becomes 6.66%. Accordingly, by changing the proportional gain to 100 L/hr (/1.33%), that is, 75.19 L/hr (/1%) and setting it, the fuel supply control valve 27 is so controlled that the fuel flow rate under the no-load conditions may become 200 L/hr and the fuel flow rate under full-load conditions may become 500 L/hr. By so controlling, the drooping characteristic may be changed without changing the rotation number.

In the embodiment now under discussion, reference has been made to the example in which the drooping characteristic is changed from 3% to 4% and, hence, by changing the proportional gain for the proportional control of a fuel control system, the value of the drooping characteristic may be arbitrarily changed. Also, by changing the rotation number (frequency) command value along with the drooping characteristic, only the value of the drooping characteristic may be changed while the rotation number (frequency) of the engine is maintained. And, even at any partial load operation, by changing the rotation number (frequency) command value, operation is possible in which the rotation number (frequency), which changes with the amount of the load is synchronized with the rated rotation (rated frequency).

In the case of the watermill type electric generation, the drooping characteristic may be changed with the use of a flow rate control parameter manipulated by means of a water volume valve, instead of the fuel flow rate, in the engine. In the power generation initial suitable condition such as, for example, the fuel cell power generation apparatus or the solar energy generating device, both of which being an example of the stationary type power generation apparatus, of a type in which a power generating output may be changed arbitrarily, since the output frequency fluctuates along with a change of the load, the frequency drooping characteristic may be changed by means of a magnitude output control (an electric current output of an rechargeable battery in the case of the solar energy generation of a kind in which a power generation structure makes use of the rechargeable battery) parameter in place of the fuel volume of the above described power generators. Nevertheless, of the power generation apparatus of any kind capable of being self-sustaining, all, in which the rotation number (frequency) may be changed with the parameter change of the drooping characteristic, form a target of the present invention.

Where the drooping characteristic is to be synchronized for the parallel operation, in addition to the drooping characteristic (static characteristic), it is desirable that the dynamic characteristic at a load changing is also synchronized between the different types of engines GT and DE. The change of the rotation number (frequency) and a chronological change of the load amount sharing at the time of initiation of the parallel operation and release of the parallel operation are schematically shown in FIG. 9. In any of the time of parallel operation and the time of release of the parallel operation, not only the drooping characteristic on the side of the gas turbine engine GT, but also the rotation number (frequency) command value is changed. It is to be noted that a voltage characteristic of the power generator is not taken into consideration in the electric power stabilization shown in FIG. 9. It is also to be noted that although during the parallel operation the respective rotation numbers (frequencies) of the engines GT and DE become equal to each other, in this figure they are shown as separated for the purpose of explaining the load sharing.

Since in general the moment of inertia differs considerably between the different types of engines GT and DE which are examples of the different types of the power generation apparatuses, the dynamic characteristic is different as shown therein. In the event that although the drooping characteristics coincide with each other, there is a large difference in dynamic characteristic, a considerable change in load results in an excessive load imposed on one of the engine before the stabilization completes on the engine side. In other words, in the event that the load abruptly increases, since the rotation number (frequency) does not lower quickly in one of the engine that has larger inertia force of the rotation (frequency) (the gas turbine engine GT in this instance), the side of the gas turbine engine GT becomes excessively loaded accordingly.

Figure 10B:
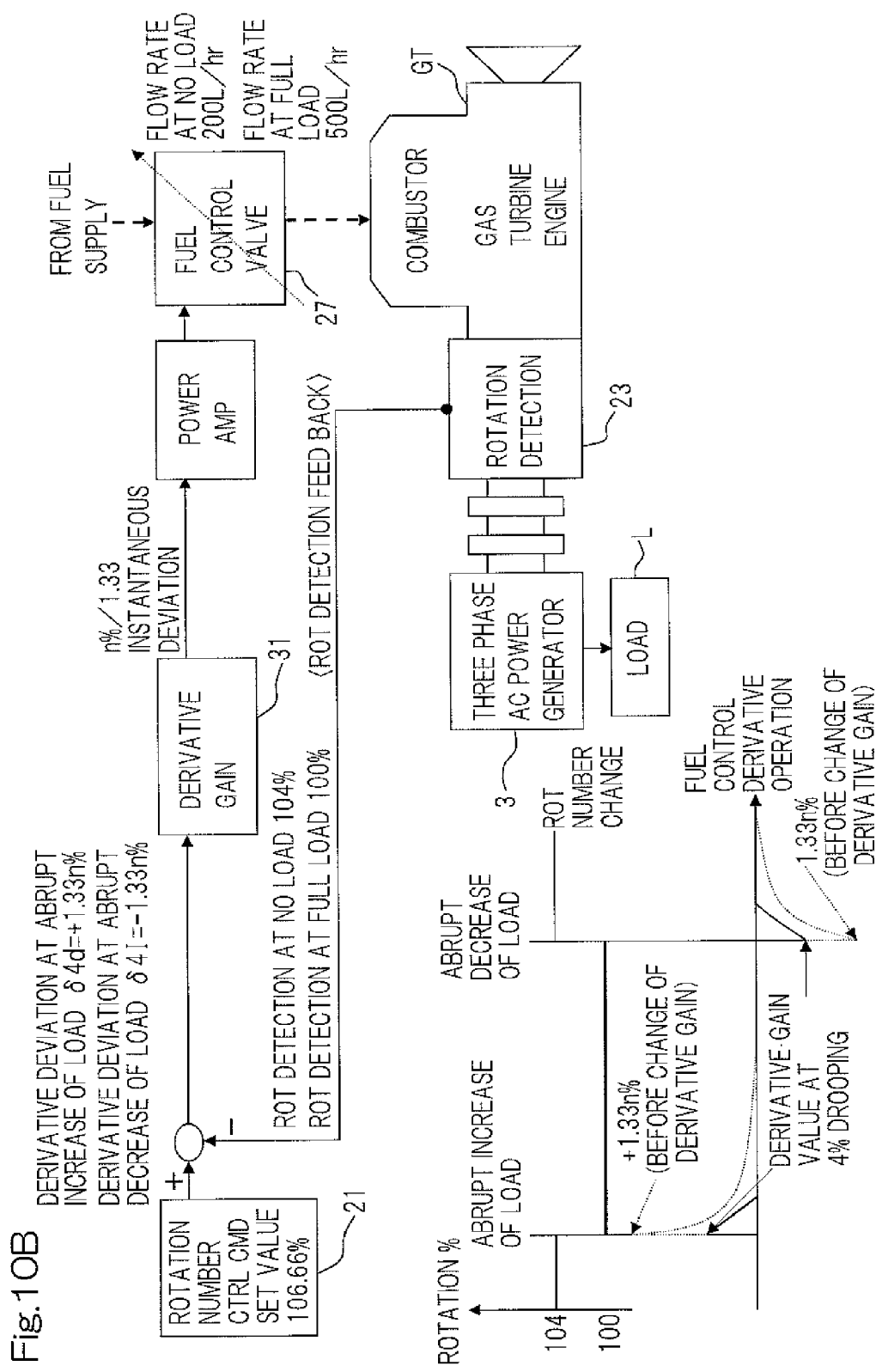
FIG. 10B is a block diagram showing a derivative gain control method according to an embodiment of the present invention.

In order to prevent the engine that has the larger inertia force of the rotation (frequency) from being excessively loaded at the initiation of the parallel operation, in the practice of this embodiment now under discussion, during the shift to the parallel operation, a derivative control gain in the feedback derivative control is changed from an optimum derivative gain under the parallel operation of the engines of the same type or the independent operation along with the change of the drooping characteristic as shown in FIGS. 10A and 10B. In the case of the parallel operation of the gas turbine engine GT and the diesel engine DE, the derivative gain on the side of the gas turbine engine GT in which the rotational inertia force is large is reduced so as to approach the characteristic on the side of the diesel engine DE having an inferior dynamic characteristic, so that generation of the load unbalance at the transit status may be suppressed.

The control system shown therein may be additionally provided in the control system for changing the drooping characteristics shown in FIGS. 8A and 8B, but only a portion associated with the control of the dynamic characteristic is shown in FIGS. 10A and 10B. FIG. 10A illustrates the case in which the drooping characteristic is 3% (the rotation number (frequency) command value: 105%) while FIG. 10B illustrates the case in which the drooping characteristic is 4%. In the case of the drooping characteristic being 3%, it is assumed, for example, that the derivative deviation 63d at the time of an abrupt increase of the load is +n %, the derivative deviation 63l at the time of an abrupt decrease of the load is −n %, and the derivative gain is set by a derivative gain setting unit 31 to n %. In the event that starting from this condition the parallel operation is initiated, the drooping characteristic is changed to 4% (in other words, the rotation number (frequency) command value is changed to 106.66%) and the load on the gas turbine engine GT is abruptly increased, for example, the drooping characteristic δ4d is +1.33n %, the increase of the load is relieved by making the derivative gain inverse proportional to the increment of the drooping characteristic to thereby change the derivative gain to n %/1.33. This equally applies even where the load on the side of the gas turbine engine GT is abruptly decreased at the time of parallel-off, in which the parallel operation is released. It is to be noted that this change of the derivative gain does not adversely affect the drooping characteristic which is a static characteristic.

In general, in the fluctuation of the load during the parallel operation between the different types of engines GT and DE as an example of the different types of power generation apparatuses having the different dynamic characteristics, an excessively high load or an excessively low load is imposed on an engine having an excellent dynamic characteristic, resulting in a temporary large unbalance in load. However, by changing to the optimum derivative gain in accordance with the change in drooping characteristic as hereinabove described, the load unbalance between the engines GT and DE may be further effectively suppressed. It is to be noted that in the examples shown in respectively in FIGS. 10A and 10B, the derivative gain on the side of the gas turbine engine GT has been reduced, but the derivative control itself on the side of the gas turbine engine GT may be stopped.

In the case of watermill type electric power generation, by means of a flow rate control parameter by manipulation of water flow rate instead of the fuel flow rate in an engine, the dynamic characteristic of the derivative control may be arbitrarily changed. In the power generation apparatus in which the power generation output can be arbitrarily changed, such as, for example, the fuel cell power generation apparatus or the solar energy generation apparatus, which is an example of the static type power generation apparatus, the dynamic characteristic of the derivative control may be arbitrarily changed by means of a magnitude output control (an electric current output of an rechargeable battery in the case of the solar energy generation of a kind in which a power generation structure makes use of the rechargeable battery) of the electric current value in place of the fuel flow rate in the above described power generator. Nevertheless, in the power generation apparatus of any kind capable of self-sustaining, all in which the dynamic characteristic can be changed with a change of the parameter of the differential characteristic may be a control target.

When the parallel operation is to be released, manipulation therefor is performed according to procedures reverse to those taken for the start of the parallel operation as hereinabove described. In other words, as a case example, after the load is shifted as the need arises from the condition in which the gas turbine engine GT and the diesel engine DE are parallel operated, the inter-engine connection shut-off switch 17 shown in FIG. 1 is opened to allow a drooping characteristic restoration change command to be outputted so that the drooping characteristic of the gas turbine engine GT may be changed by restoration from 4% to the original value of 3%. Also, in accord with this timing of release, the derivative gain is changed by restoration to the optimum value at the time of the independent operation. In this way, since the drooping characteristic of the gas turbine engine GT is changed even at the time of release so that the initial optimum condition for the operation of the power generation apparatus may be resumed, the power generation apparatus may be operated under the condition in which the drooping characteristic has been changed only when the parallel operation is required, and, on the other hand, the power operation apparatus independently operated may be operated under the suitable conditions when the parallel operation is unnecessary and the independent operation is to be performed.

Also, in the event that, where the power generation apparatuses having the different characteristics are released and the structure of the power generator in the electric power source system in which the parallel operation is performed is changed, a change appears as the rotation number (frequency) drooping characteristic and the dynamic characteristic as the electric power generating system, the change may be arbitrarily accomplished while in a linked operation and the change to the operation as the optimum power generation apparatus may be arbitrarily accomplished.

It is to be noted that what has been described above is a control method applicable where the change of the drooping characteristic is mainly automatically initiated, but the change of the drooping characteristic may be initiated manually. Where the change of the drooping characteristic is initiated manually, the change of the drooping characteristic is to be performed by manually applying a command to initiate the change of the drooping characteristic and subsequently performing a parallel operation initiating operation, and the procedures other than those described above are similar to those used during the automatic change.

Hereinafter, the control flow for changing the drooping characteristic will be described with particular reference to a control block diagram shown in FIG. 11. It is to be noted that in the description that follows, the change flow of the proportional gain when the drooping characteristic is to be changed will be discussed, but the change of the derivative gain may be accomplished by similar procedures.

At the time of initiation of the parallel operation, the inside of a control logic is first initialized in response to a start signal of the power generation apparatus. Specifically, in response to an initialization command signal from a control constant initializing unit 41, a proportional gain initial value PB is set in the proportion gain setting unit 25 and, at the same time, a rotation number (frequency) initial value NB is set in the rotation number (frequency) command value setting unit 21. Each time a change command of the drooping characteristic is applied, the proportional gain is changed. Also, a rotation number (frequency) change in the rotation number (frequency) command value setting unit 21 is possible at all times. It may occur that a rated operating condition of the rotation number (frequency) is provided as an interlock.

A drooping characteristic changing operation is initiated upon receipt of a drooping characteristic change enabling signal and a drooping characteristic change command signal. As the drooping characteristic change enabling signal, a rated rotation number (rated frequency) signal (under a ±5% rotation condition of the rated rotation number) of the power generation apparatus is usually employed.

The drooping characteristic change command signal referred to above is supplied in the event that either the drooping characteristic change command for automatic change or the drooping characteristic change command for manual change is outputted. The drooping characteristic change command signal for automatic change and that for manual change are applied in the following manners, respectively.

In the case of the automatic change, normally, when all of charge signal for a target power generation apparatus shut-off switch (the gas turbine engine shut-off switch in this instance) 5, the different power generation apparatus shut-off switch (the diesel engine shut-off switch in this instance) 15 and the inter-engine connection shut-off switch 17 are outputted, the drooping characteristic change command signal for automatic change is recognized. In the case of the manual change, a signal of the drooping characteristic change command is supplied manually from a drooping characteristic manual change command unit 43. When all of the target apparatus shut-off switch 5, the different types of type shut-off switch 15 and the inter-engine connection shut-off switch 17 are shut off before a manual signal from the drooping characteristic manual change command unit enters, the drooping characteristic change is initiated automatically.

A change period setting unit 45 performs a setting of a graded (step-by-step) change period for changing the drooping characteristic. The drooping characteristic is so set as to be changed instantaneously when at a zero (0) setting, or changed gradually when at a setting other than zero.

Also, when the condition for initiation of the drooping characteristic change is satisfied, a change amount initial value for the proportional gain resulting from the change of the drooping characteristic is set by a proportional gain change amount initial value setting unit 47. With the total amount of the proportional gain change amounts being added, a change of the proportional gain completes.

A proportional gain change amount calculation unit 49 is operable to calculate the proportional gain change rate for each predetermined cycle (in general, a sampling time of the control system) from a change period of the drooping characteristic and the proportional gain change amount and then to subtract from a proportional gain operation value according to this change rate so calculated. In the case where the change period of the drooping characteristic is the zero setting, the proportional gain change amount is equal to the proportional gain change rate and the total amount of the proportional gain change amounts are subtracted instantaneously (that is, in one cycle of the sampling time), thus completing the drooping characteristic change. On the other hand, in the case where the drooping characteristic is so set as to be changed gradually or in the graded fashion, the proportional gain change rate is subtracted for each predetermined cycle from the initial value of the proportional gain change amount.

By a drooping characteristic change determination unit 51, a decision is made on whether or not the change of a proportional gain change amount component has been completed and, if it is determined that such change has been completed, subtraction of the proportional gain terminates.

Also, when the condition for the initiation of the drooping characteristic change is satisfied, a change amount initial value of a rotation command (frequency command) for changing the drooping characteristic is set by a rotation number (frequency) change amount initial value setting unit 53. With the total amount of rotation commands (frequency command) change amounts being added, change of the number of the rotation commands (frequency commands) completes.

A rotation number command (frequency command) change amount calculation unit 55 is operable to calculate a rotation number command change rate for each predetermined cycle (in general, the sampling time of the control system) from the rotation number command (frequency command) change amount and a change period of the drooping characteristic set by the change period setting unit 45 and then to subtract from an operation value of the rotation number command (frequency command) value setting unit 21 in accordance with the change rate so calculated. In the case where the change period of the drooping characteristic is the zero setting, the rotation number command (frequency command) value change amount is equal to the rotation number command (frequency command) value change rate and the total amount of the rotation number command (frequency command) value change amounts are subtracted instantaneously (that is, in one cycle of the sampling time), thus completing the change of the rotation number command (frequency command) value. On the other hand, in the case where the drooping characteristic is so set as to be changed gradually or in the graded fashion, the rotation number command (frequency command) value change rate is subtracted for each predetermined cycle from the initial value of the rotation number command (frequency command) value change amount.

By a rotation number command (frequency command) value change determination unit 57, a decision is made on whether or not the change of a rotation number command (frequency command) value change amount component has been completed and, if it is determined that such change has been completed, subtraction of the rotation number command (frequency command) value terminates.

In the next place, a control method for release of the parallel operation (parallel-off) will be described. It is to be noted that in the description that follows, a change to bring the drooping characteristic from the value during the parallel operation (4% in the embodiment now under discussion) back to the value during the independent operation (3% in the embodiment now under discussion) is referred to as "restorative change". At the time of the parallel-off, in response to a drooping characteristic restorative change enabling signal and a drooping characteristic restorative change command signal, a drooping characteristic restorative change operation is initiated. As the drooping characteristic restorative change enabling signal, a rated rotation number (rated frequency) signal (5% rotation (frequency) condition of the rated rotation number (rated frequency)) of the power generation apparatus is normally employed.

The drooping characteristic restorative change command signal is supplied when either the drooping characteristic restorative change command for the automatic change or the drooping characteristic restorative change command for the manual change is outputted. The drooping characteristic restorative change command signal for automatic change and that for manual change are applied in the following manners, respectively.

In the case of the automatic change, generally, when at least one of the target power generation apparatus shut-off switch 5, the inter-engine connection shut-off switch 17 and the different power generation apparatus shut-off switch 15 is opened, the drooping characteristic restorative change command signal is recognized. In the case of the manual change, a signal of the drooping characteristic restorative change command is supplied manually from a drooping characteristic manual restorative change command unit 143. When at least one of the target power generation apparatus shut-off switch 5, the inter-engine connection shut-off switch 17 and the different power generation apparatus shut-off switch 15 is opened before a manual signal from the drooping characteristic manual restorative change command unit 143 enters, the drooping characteristic restorative change is performed automatically.

Setting of a gradual change period for performing the restorative change of the drooping characteristic is performed by a restorative change period setting unit 145. The drooping characteristic is so set as to be restoratively changed in a graded fashion either instantaneously when at a zero (0) setting, but gradually when at a setting other than zero.

Also, when the condition for initiation of the drooping characteristic restorative change is satisfied, a restorative change amount initial value for the proportional gain resulting from the restorative change of the drooping characteristic is set by a proportional gain restorative change amount initial value setting unit 147. With the total amount of the proportional gain restorative change amounts being added, a restorative change of the proportional gain completes.

A proportional gain restorative change amount calculation unit 149 is operable to calculate the proportional gain restorative change rate for each predetermined cycle (in general, a sampling time of the control system) from a change period of the drooping characteristic and the proportional gain restorative change amount and then to subtract from a proportional gain operation value according to this change rate so calculated. In the case where the restorative change period of the drooping characteristic is the zero setting, the proportional gain restorative change amount is equal to the proportional gain change rate and the total amount of the proportional gain restorative change amounts are subtracted instantaneously (that is, in one cycle of the sampling time), thus completing the drooping characteristic restorative change. On the other hand, in the case where the drooping characteristic is so set as to be restoratively changed gradually, the proportional gain restorative change rate is subtracted for each predetermined cycle from the initial value of the proportional gain restorative change amount.

A decision is made by a drooping characteristic restorative change determination unit 151 to determine whether or not the change of a proportional gain restorative change amount component has been completed and, if it is determined that such change has been completed, subtraction of the proportional gain terminates.

When the condition for the initiation of the drooping characteristic restorative change is satisfied, a restorative change amount initial value of a rotation number command (frequency command) for the time of the drooping characteristic restorative change is set by a rotation number (frequency) restorative change amount initial value setting unit 153. With the total amount of rotation number command (frequency command) restorative change amounts being added, a restorative change of the rotation number command (frequency command) completes.

A rotation number command (frequency command) restorative change amount calculation unit 155 is operable to calculate a rotation command number change rate for each predetermined cycle (in general, the sampling time of the control system) from the rotation number command (frequency command) restorative change amount and a restorative change period of the drooping characteristic set by the restorative change period setting unit 145 and then to subtract from an operation value of the rotation number command (frequency command) value setting unit 21 in accordance with the change rate so calculated. In the case where the restorative change period of the drooping characteristic is the zero setting, the rotation number command (frequency command) value restorative change amount is equal to the rotation number command (frequency command) value change rate and the total amount of the rotation number command (frequency command) value restorative change amounts are subtracted instantaneously (that is, in one cycle of the sampling time), thus completing the restorative change of the rotation number command (frequency command) value. On the other hand, in the case where the drooping characteristic is so set as to be restoratively changed gradually, the rotation number command (frequency command) value restorative change rate is subtracted for each predetermined cycle from the initial value of the rotation number command (frequency command) value change amount.

By a rotation number command (frequency command) value restorative change determination unit 157, a decision is made on whether or not the restorative change of a rotation number command (frequency command) value restorative change amount component has been completed and, if it is determined that such restorative change has been completed, subtraction of the rotation number command (frequency command) value terminates.

In this control system, not only when during the parallel operation of the gas turbine engine GT and the diesel engine DE, which is an example of a combination of the different types of power generation apparatuses, a release signal is outputted, but also when the parallel operation is abruptly interrupted by any reason, it is possible to capture this release command so that in the side of the gas turbine engine GT having a high drooping characteristic, the drooping characteristic can be restoratively changed automatically from 4% at the time of the parallel operation down to 3% after the release of the parallel operation without changing the rotation number.

As hereinabove described in detail, according to the parallel operation control method for the different types of power generation apparatuses, which is designed in accordance with the embodiments of the present invention, even starting from the condition in which the power generation apparatuses are independently operated at the optimum drooping characteristics, respectively, shift to the parallel operation may be accomplished while suppressing an undesirable generation of the unbalance in load. Accordingly, without adversely affecting respective performances of the different types of power generation apparatuses and with a satisfactory stabilization, the parallel operation of the different types of power generation apparatuses may be performed.

Although the present invention has been fully described in connection with the embodiments thereof with reference to the accompanying drawings which are used only for the purpose of illustration, those skilled in the art will readily conceive numerous changes and modifications within the framework of obviousness upon the reading of the specification herein presented of the present invention. Accordingly, such changes and modifications are, unless they depart from the scope of the present invention as delivered from the claims annexed hereto, to be construed as included therein

REFERENCE NUMERALS

1 . . . Control system
5 . . . Gas turbine engine shut-off switch
15 . . . Diesel engine shut-off switch
17 . . . Inter-engine connection shut-off switch
21 . . . Rotation number command value setting unit
23 . . . Rotation number detector
25 . . . Proportional gain setting unit
DE . . . Diesel engine (Power generation apparatus)
GT . . . Gas turbine engine (Power generation apparatus)

What is claimed is:

1. A parallel operation control method for different types of power generation apparatuses to shift the plurality of power generation apparatuses that have respective different drooping characteristics, in which the drooping characteristic is defined as a characteristic of decrease of a rated frequency along with an increase of a load, from an independent operation of each of the power generation apparatuses under respective suitable drooping characteristics to the parallel operation of the apparatuses to drive a common drive target, which method comprising:

determining a load of one of the power generation apparatuses by subtracting a load of the other of the power generation apparatuses from a predetermined required load;

changing a drooping characteristic of the one of the power generation apparatuses so as to coincide with a drooping characteristic of the other of the power generation apparatuses; and controlling the one of the power generation apparatuses so as to maintain frequency thereof at the time of changing the drooping characteristic.

2. The parallel operation control method for different types of power generation apparatuses as claimed in claim 1, further comprising performing a feedback control to maintain the frequency of each of the power generation apparatus to be constant, in which a derivative control based on a time derivative of the frequency is performed and, also, the derivative control with respect to the one of the power generation apparatuses that has a higher frequency inertia force is suppressed or stopped at the time of an abrupt change of a load.

3. The parallel operation control method for different types of power generation apparatuses as claimed in claim 1, wherein at the time of shifting to the independent operation after the parallel operation has been released, the drooping characteristic of the one of the power generation apparatus is restored to the drooping characteristic before the changing.

4. The parallel operation control method for the different types of power generation apparatuses as claimed in claim 1, wherein as the power generation apparatuses, power generation apparatuses, each having a rotary machine capable of being controlled in its rotation number, are used.

5. The parallel operation control method for the different types of power generation apparatuses as claimed in claim 4, wherein the other of the power generation apparatuses is a diesel engine and the one of the power generation apparatuses is a gas turbine engine.

6. The parallel operation control method for the different types of power generation apparatuses as claimed in claim 1, wherein as the power generation apparatuses stationary type power generation apparatuses each having no rotary machine are used.

7. A parallel operation control system for different types of power generation apparatuses when shifting the plurality of power generation apparatuses that have respective different drooping characteristics, in which the drooping characteristic is defined as a characteristic of decrease of a rated frequency along with an increase of a load, from an independent operation of each of the power generation apparatuses under respective suitable drooping characteristics to the parallel operation of the apparatuses to drive a common drive target, which method comprising:
  a unit to determine a load of one of the power generation apparatuses by subtracting a load of the other of the power generation apparatuses from a predetermined required load;
  a unit to change a drooping characteristic of the one of the power generation apparatuses so as to coincide with a drooping characteristic of the other of the power generation apparatuses; and
  a unit to control the one of the power generation apparatuses so as to maintain frequency thereof at the time of change of the drooping characteristic.

8. The parallel operation control system as claimed in claim 7, further comprising a unit to perform a feedback control to maintain the frequency of each of the power generation apparatus to be constant, in which a derivative control based on a time derivative of the frequency is performed and, also, the derivative control with respect to the one of the power generation apparatuses that has a higher frequency inertia force is suppressed or stopped at the time of an abrupt change of a load.

9. The parallel operation control system as claimed in claim 7, further comprising a unit to restore the drooping characteristic of the one of the power generation apparatus to the drooping characteristic before the changing at the time of shifting to the independent operation after the parallel operation has been released.

10. The parallel operation control system as claimed in claim 7, wherein as the power generation apparatuses, power generation apparatuses, each having a rotary machine capable of being controlled in its rotation number, are used.

11. The parallel operation control system as claimed in claim 10, wherein the other of the power generation apparatuses is a diesel engine and the one of the power generation apparatuses is a gas turbine engine.

12. The parallel operation control system as claimed in claim 7, wherein as the power generation apparatuses stationary type power generation apparatuses each having no rotary machine are used.

\* \* \* \* \*